United States Patent
Huang et al.

(10) Patent No.: US 9,774,245 B1
(45) Date of Patent: Sep. 26, 2017

(54) PFC SWITCHING POWER CONVERSION CIRCUIT PROVIDING LOW TOTAL HARMONIC DISTORTION

(71) Applicant: Alitek Technology Corp., Taipei (TW)

(72) Inventors: Wen-Hung Huang, Taipei (TW); Kashel Dmitry, Taipei (TW)

(73) Assignee: ALITEK TECHNOLOGY CORP., Taipei (TW)

( * ) Notice: Subject to any disclaimer, the term of this patent is extended or adjusted under 35 U.S.C. 154(b) by 0 days.

(21) Appl. No.: 15/211,220

(22) Filed: Jul. 15, 2016

(51) Int. Cl.
*H02M 1/42* (2007.01)
*H02M 1/44* (2007.01)
*H02M 1/08* (2006.01)
*H02M 7/06* (2006.01)
*H02M 1/00* (2006.01)

(52) U.S. Cl.
CPC .............. *H02M 1/42* (2013.01); *H02M 1/08* (2013.01); *H02M 1/44* (2013.01); *H02M 7/06* (2013.01); *H02M 2001/0009* (2013.01)

(58) Field of Classification Search
CPC ............ H02M 1/12; H02M 1/14; H02M 1/15; H02M 1/42; H02M 1/44; H02M 7/48; H02M 7/217; H02M 1/126; H02M 1/4208; H02J 3/01; G05F 1/30
USPC ......... 363/39, 40, 44, 45, 47, 78, 81, 84, 95
See application file for complete search history.

(56) References Cited

U.S. PATENT DOCUMENTS

| | | | | | |
|---|---|---|---|---|---|
| 5,272,429 | A * | 12/1993 | Lipo | ......... | H02P 6/187 318/802 |
| 5,764,495 | A * | 6/1998 | Faulk | ......... | H02M 3/33507 323/303 |
| 5,844,193 | A * | 12/1998 | Nomura | ......... | B23K 11/24 219/110 |
| 7,885,085 | B2 * | 2/2011 | Orr | ......... | H02M 1/4225 363/21.02 |
| 9,497,810 | B1 * | 11/2016 | Huang | ......... | H05B 33/0815 |
| 2008/0198638 | A1 * | 8/2008 | Reinberger | ......... | H02M 3/3376 363/74 |
| 2010/0060200 | A1 * | 3/2010 | Newman, Jr. | ......... | H05B 41/2822 315/307 |
| 2012/0153858 | A1 * | 6/2012 | Melanson | ......... | H02M 3/33523 315/279 |
| 2013/0128640 | A1 * | 5/2013 | Lee | ......... | H02M 7/12 363/126 |

(Continued)

*Primary Examiner* — Adolf Berhane
(74) *Attorney, Agent, or Firm* — Ming Chow; Sinorica, LLC

(57) ABSTRACT

A PFC switching power conversion circuit providing low THD, including: a bridge rectifier for providing an input voltage according to an AC voltage; an electromagnetic interference filtering circuit for providing a line voltage according to the input voltage; a switching power converter for converting the line voltage to an output voltage or current under a control of a driving voltage, the driving voltage causing a switching current to flow through a main inductor; and a controller for receiving and processing at least one feedback signal from the switching power converter to generate the driving voltage in a constant on-time manner, the controller including an off-time detector and a timer, the off-time detector being used to detect decreasing periods of the switching current to determine respective off-time periods, and the timer being used to set a minimum limit on the respective off-time periods.

10 Claims, 4 Drawing Sheets

(56) References Cited

U.S. PATENT DOCUMENTS

| | | | |
|---|---|---|---|
| 2013/0201731 A1* | 8/2013 | Gu | H02M 1/4225 |
| | | | 363/21.17 |
| 2015/0078050 A1* | 3/2015 | Colbeck | H02M 7/066 |
| | | | 363/126 |
| 2015/0264769 A1* | 9/2015 | Jelaca | H05B 33/0845 |
| | | | 315/206 |
| 2016/0276936 A1* | 9/2016 | Gritti | H02M 1/4258 |

* cited by examiner

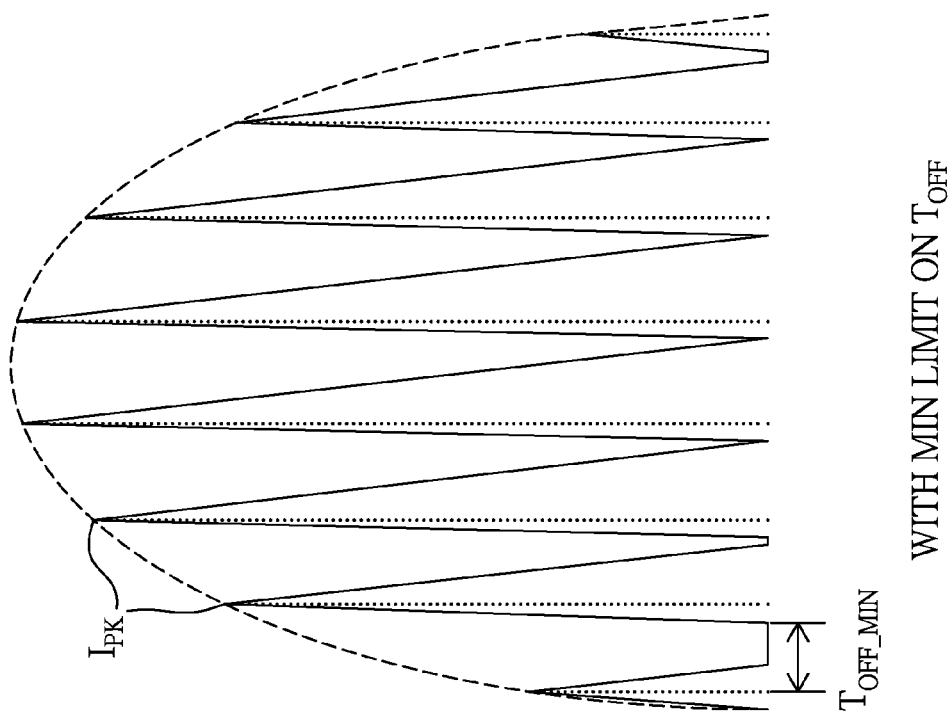
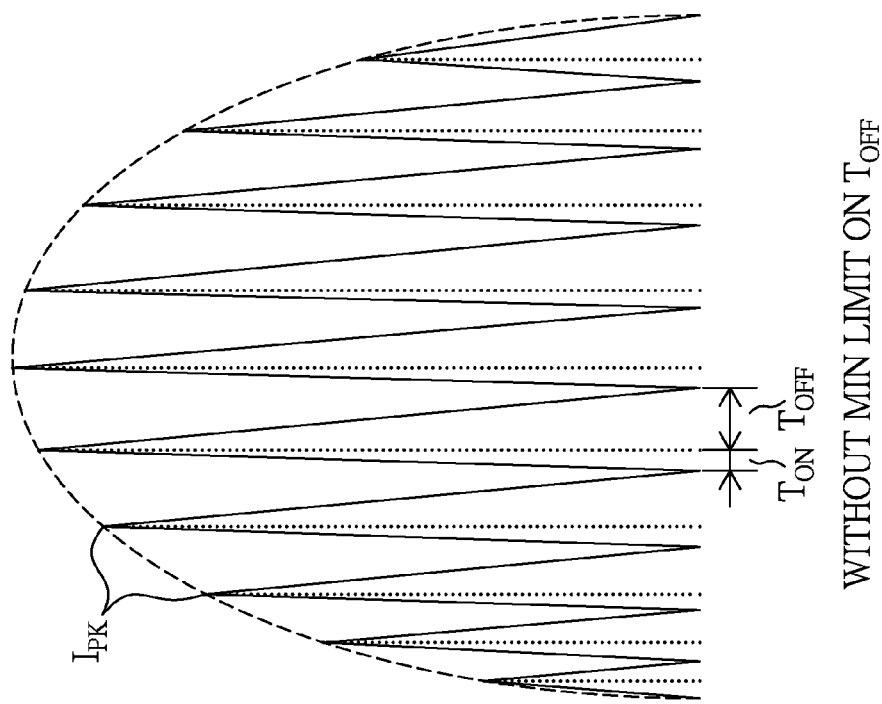
FIG. 3a

PFC SWITCHING POWER CONVERSION CIRCUIT PROVIDING LOW TOTAL HARMONIC DISTORTION

BACKGROUND OF THE INVENTION

Field of the Invention

The present invention relates to a switching power conversion circuit providing a PFC (power factor correction) function with low THD (total harmonic distortion) while converting a standard AC (alternating current) voltage or a phase-cut AC voltage to a DC (direct current) output voltage or a DC output current.

Description of the Related Art

Conventional switching power conversion circuits are generally used to convert an AC voltage source to a DC output voltage or a DC output current for a load, and the load can be an LED (light emitting diode) module, a battery or an electronic device, etc.

Besides, when converting an AC voltage source to a DC output voltage or a DC output current, a good power factor is generally required. Taking a buck-boost power converter with a constant on-time mechanism operating in a BCM (boundary conduction mode) for example (the major operation waveforms thereof are shown in FIG. 1), the operation principle thereof can be characterized by the equations as follows:

$$I_{PK} = (V_{IN}/L_{MAIN}) * T_{ON}, \quad (1)$$

where $V_{IN}$ is a full-wave rectified voltage derived from a standard AC voltage; $L_{MAIN}$ is an inductance value of a main inductor for storing and releasing energy in terms of current; $T_{ON}$ is a turn-on time for building up a current flowing through the main inductor in each cycle of the switching cycles, and the switching cycles have different periods corresponding to different levels of the full-wave rectified voltage $V_{IN}$ present at different start time points of the switching cycles; and $I_{PK}$ is a peak value of the current through the main inductor built up per switching cycle, and $I_{PK}$ has different values corresponding to different levels of $V_{IN}$ respectively.

$$T_{OFF} = (V_{IN}/V_{OUT}) * T_{ON}, \quad (2)$$

where $V_{OUT}$ is a DC output voltage, $T_{OFF}$ is a turn-off time in each switching cycle for discharging the current through the main inductor, and the length of $T_{OFF}$ is dependent on the corresponding voltage level of $V_{IN}$. In general, there are many switching cycles during a half sinusoidal period of $V_{IN}$, each switching cycle corresponds to a different level of $V_{IN}$, and the higher/lower the level of $V_{IN}$ is, the longer/shorter the length of $T_{OFF}$ will be. That is, when $V_{IN}$ is at higher/lower levels, $I_{PK}$ will get higher/lower, and it will take longer/shorter time to discharge the current through the main inductor.

$$(3) I_{IN\text{-}AVG} = (1/2) * T_{on} * I_{PK} / (T_{ON} + T_{OFF})$$

$$= (1/2) * T_{on} * [V_{OUT} / (L_{MAIN} * (V_{IN} + V_{OUT}))] * V_{IN}$$

$$= G * V_{IN},$$

where $I_{IN\text{-}AVG}$ is an averaged input current per switching cycle, and $G = (\frac{1}{2}) * T_{on} * [V_{OUT}/(L_{MAIN} * (V_{IN} + V_{OUT}))]$ is not a constant gain but inversely proportional to $V_{IN}$, given fixed values of $L_{MAIN}$ and $V_{OUT}$. That is, when $V_{IN}$ is at higher/lower levels, G will become lower/higher to introduce a THD into the input current.

To reduce the THD of the input current, one solution is using a sampling circuit to periodically sample the voltage of $V_{IN}$, and use the sampled voltage of $V_{IN}$ to modify the value of the gain G so as to keep the envelope of the input current as close to the envelope of $V_{IN}$ as possible. However, this kind of solutions generally makes the control mechanism of the switching power converter more complex.

To solve the foregoing problems, a novel switching power conversion circuit is needed.

SUMMARY OF THE INVENTION

One objective of the present invention is to disclose a PFC switching power conversion circuit, which is capable of providing low THD without the need of sensing the level of an input voltage.

Another objective of the present invention is to disclose a PFC switching power conversion circuit, which uses a simple and robust control mechanism to compensate a nonlinear relationship between an input current and an input voltage, thereby minimizing the THD of the input current.

Still another objective of the present invention is to disclose a PFC switching power conversion circuit, which is capable of reducing the THD of an input current by setting a minimum limit on the off time per switching cycle.

To attain the foregoing objectives, a PFC switching power conversion circuit providing low total harmonic distortion is proposed, including:

a bridge rectifier for providing an input voltage by performing a rectifying operation on an AC voltage;

an electromagnetic interference filtering circuit for providing a line voltage by performing a filtering operation on the input voltage;

a switching power converter for converting the line voltage to an output voltage or an output current for a load under a control of a driving voltage, wherein the driving voltage causes a switching current to flow through a main inductor of the switching power converter in a waveform of triangular pulses; and a controller for receiving at least one feedback signal from the switching power converter to generate the driving voltage, the controller operating in a constant on-time mode to determine an on-time period of the driving voltage by processing the at least one feedback signal, and the on-time period determines a rising period for each of the triangular pulses of the switching current;

wherein the controller includes an off-time detector and a timer, the off-time detector being used to detect decreasing periods of the switching current by processing the at least one feedback signal to determine off-time periods respectively, and the timer being used to set a minimum limit on the off-time periods.

In one embodiment, the controller further includes a driver for providing the driving voltage.

In one embodiment, the controller further includes a feedback circuit for processing the at least one feedback signal to generate an on-time determining signal for determining the on-time period, and generate an end-of-off-time signal for the off-time detector to determine the off-time periods.

In one embodiment, the controller further includes an on-time control unit for determining the on-time period according to the on-time determining signal.

In one embodiment, the AC voltage is a phase-cut AC voltage.

In one embodiment, the at least one feedback signal includes a voltage feedback signal and/or a current feedback signal.

In one embodiment, the switching power converter is an isolated switching power converter.

In one embodiment, the switching power converter is a non-isolated switching power converter.

In one embodiment, the controller includes a compensation circuit for adjusting the on-time period according to the at least one feedback signal.

In one embodiment, the timer has a fixed counting duration or an adjustable counting duration for determining the minimum limit.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

FIG. 3a-3b illustrate operation waveforms of the power converter of the present invention in comparison with operation waveforms of a conventional power converter.

DETAILED DESCRIPTION OF THE PREFERRED EMBODIMENTS

Figure 1:
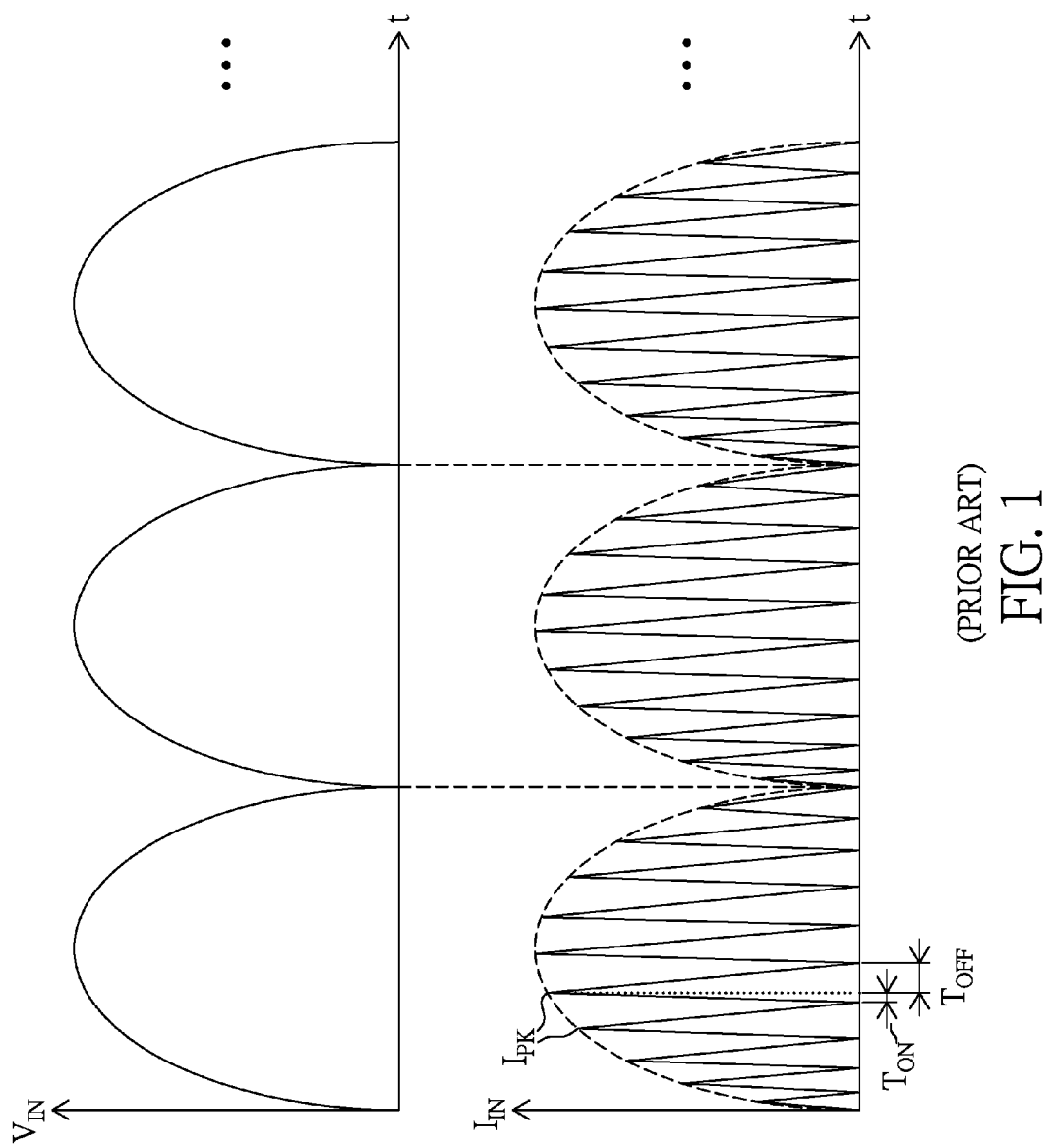
FIG. 1 illustrates major operation waveforms of a prior art buck-boost power converter with a constant on-time mechanism operating in a boundary conduction mode.
Figure 2:
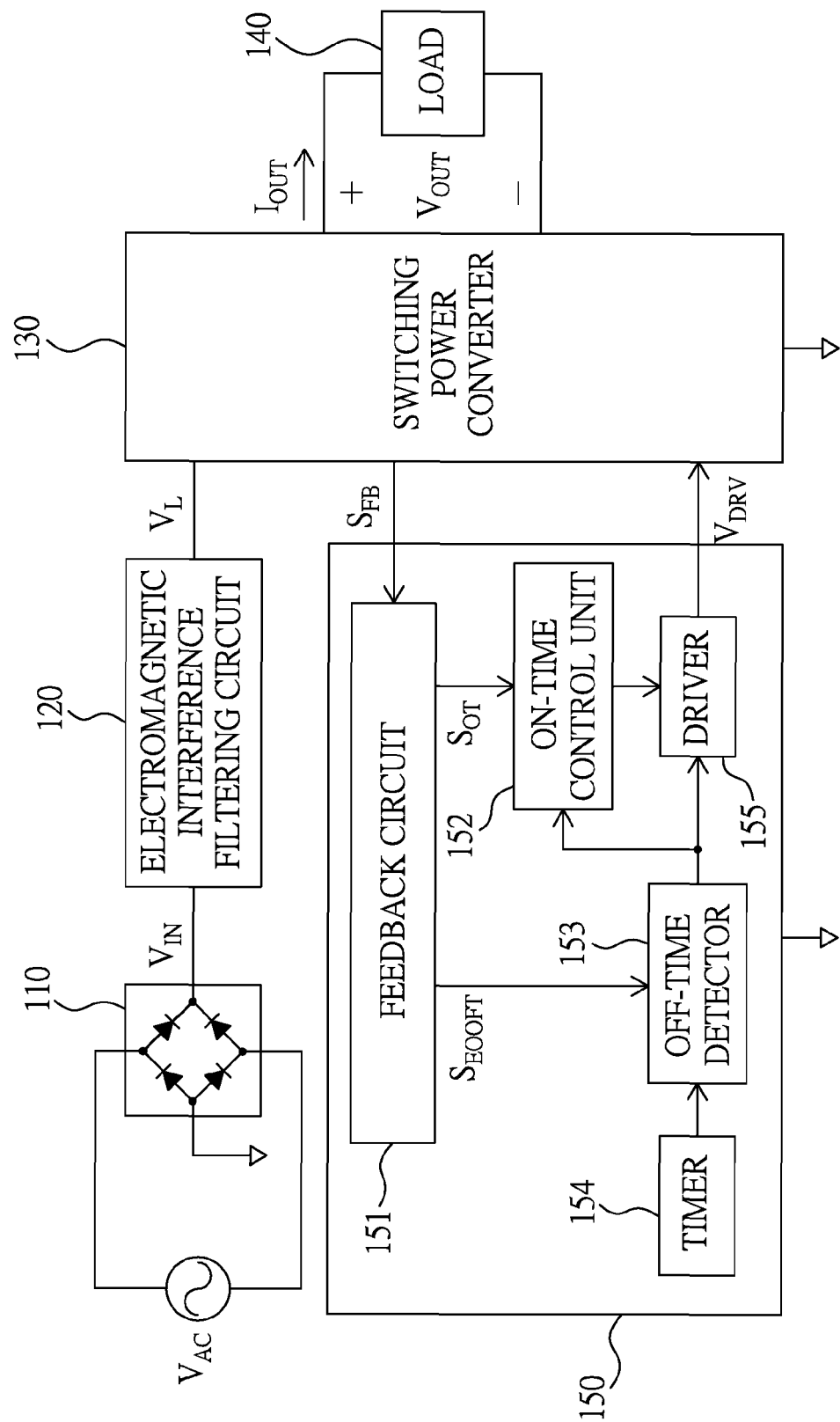
FIG. 2 illustrates a circuit diagram of a PFC switching power conversion circuit providing low total harmonic distortion according to an embodiment of the present invention.
Figure 3B:
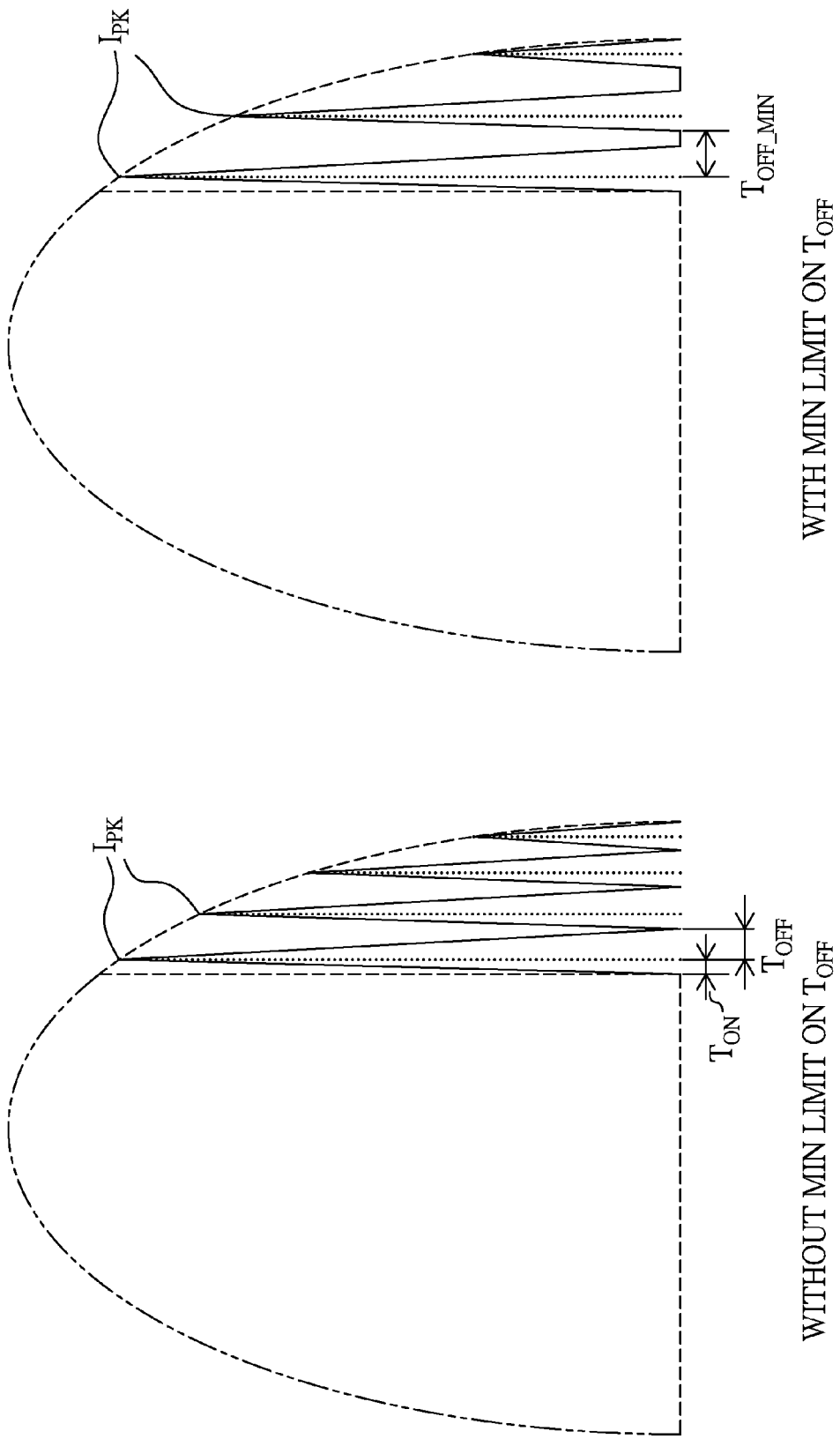

Please refer to FIG. 2, which illustrates a circuit diagram of a PFC switching power conversion circuit providing low total harmonic distortion according to an embodiment of the present invention. As illustrated in FIG. 2, the PFC switching power conversion circuit includes a bridge rectifier 110, an electromagnetic interference filtering circuit 120, a switching power converter 130, a load 140, and a controller 150, the controller 150 including a feedback circuit 151, an on-time control unit 152, an off-time detector 153, a timer 154, and a driver 155.

The bridge rectifier 110 is used for providing an input voltage $V_{IN}$ by performing a rectifying operation on an AC voltage $V_{AC}$. The AC voltage $V_{AC}$ can be a standard AC voltage or a phase-cut AC voltage. The phase-cut AC voltage is generally generated by a dimmer circuit including a TRIAC.

The electromagnetic interference filtering circuit 120 is used for providing a line voltage $V_L$ by performing a filtering operation on the input voltage $V_{IN}$ to filter out accompanying noises.

The switching power converter 130, which can be an isolated switching power converter (generally using a transformer for power transformation) or a non-isolated switching power converter, is used for converting the line voltage $V_L$ to an output voltage $V_{OUT}$ or an output current $I_{OUT}$ for the load 140 under a control of a driving voltage $V_{DRV}$. When in operation, the driving voltage $V_{DRV}$ will cause a switching current having a waveform of triangular pulses to flow through a main inductor (not shown in the figure) of the switching power converter 130.

The controller 150 is used for receiving at least one feedback signal $S_{FB}$, which can include a voltage feedback signal and/or a current feedback signal, from the switching power converter 130 to generate the driving voltage $V_{DRV}$, the controller 150 operates in a constant on-time mode to determine an on-time period, which may be a same on time for each switching cycle of the driving voltage $V_{DRV}$, by processing the at least one feedback signal $S_{FB}$, and the on-time period determines a rising period for each of the triangular pulses of the switching current. Besides, the controller 150 can also include a compensation circuit for adjusting the on-time period according to the at least one feedback signal to enhance the power factor and reduce the THD.

When in operation, the feedback circuit 151 will use the at least one feedback signal $S_{FB}$ to generate an on-time determining signal $S_{OT}$ and an end-of-off-time signal $S_{EOOFT}$.

The on-time control unit 152 operates in a constant on-time mode and determines the on-time period for each switching cycle of the driving voltage $V_{DRV}$ according to the on-time determining signal $S_{OT}$. In one embodiment, the on-time control unit 152 performs a low-pass filtering operation on an error signal representing a difference between the on time determining signal $S_{OT}$ and a reference level to generate a threshold signal, and uses the threshold signal to compare with a sawtooth signal to determine the on-time period. The sawtooth signal can be generated by repeatedly charging and discharging a capacitor with a current source and a discharging circuit (not shown in the figure) respectively, and the value of the current source can be a fixed value or adjusted by a modulation signal generated according to the at least one feedback signal $S_{FB}$.

The off-time detector 153 is used to detect decreasing periods of the switching current according to the end-of-off-time signal $S_{EOOFT}$ to determine off-time periods of switching cycles respectively, and the timer 154, which can repeatedly count for a predetermined duration, is used to set a minimum limit on each of the off-time periods, and the off-time detector 153 generates resultant off-time periods according to the off-time periods and the minimum limit in a way that, any of the resultant off-time periods is set to be equal to the minimum limit when a corresponding period of the off-time periods is shorter than the minimum limit, and any of the resultant off-time periods is set to be equal to a corresponding period of the off-time periods when the corresponding period is not shorter than the minimum limit. That is, the resultant off-time period is set to be equal to a larger one of the off-time period and the minimum limit. Besides, the predetermined duration of the timer 154 can be a fixed counting duration or an adjustable counting duration.

The driver 155 will provide the driving voltage $V_{DRV}$ having an active period and an inactive period in each cycle of switching cycles, wherein each period of the active periods is defined by the on-time period, and inactive periods are defined by the resultant off-time periods correspondingly.

Besides, as is known from the description of related art above, when a power converter operates in a constant on-time mode, the relation between the average input current TIN-AVG and the full-wave rectified input voltage $V_{IN}$ can be expressed as $I_{IN-AVG}=G*V_{IN}$, $G=(\frac{1}{2})*Ton*[V_{OUT}/(L_{MAIN}*(V_{IN}+V_{OUT}))]$, wherein the gain G is inversely proportional to $V_{IN}$. That is, the gain G is higher when the full-wave rectified input voltage $V_{IN}$ is at low levels than when the full-wave rectified input voltage $V_{IN}$ is at high levels, and this non-uniform variation causes substantial THD to the input current.

As the gain G can also be expressed as $G=(\frac{1}{2})*[T_{ON}^2/(L_{MAIN}*(T_{ON}+T_{OFF}))]$, therefore, by setting a minimum limit on the off-time period $T_{OFF}$, the gain G can be kept at a lower value rather than rising up when the full-wave rectified input voltage $V_{IN}$ is approaching low levels, and the THD can be effectively reduced accordingly. That is, when the full-wave rectified input voltage $V_{IN}$ is at low levels to cause off-time periods shorter than a preset value, by using the preset value as a minimum limit for the off-time period $T_{OFF}$ at these instances, the distortion of the gain G can be effectively compensated. Please refer to the table below, which gives experiment results of THD at different AC voltages for the present invention (with minimum $T_{OFF}$) and a conventional scheme (without limiting $T_{OFF}$) respectively. As can be seen in the table, the THD values of the present invention are much lower than the corresponding THD values of the conventional scheme.

| AC voltage | THD of the present invention (with minimum $T_{OFF}$) | THD of a conventional scheme (without limiting $T_{OFF}$) |
| --- | --- | --- |
| 120 V | 9.90% | 18.70% |
| 230 V | 12.50% | 26.20% |
| 277 V | 14.30% | 27.80% |

Thanks to the designs disclosed above, the present invention offers the advantages as follows:

1. The PFC switching power conversion circuit of the present invention can provide low THD without the need of sensing the level of an input voltage.

2. The PFC switching power conversion circuit of the present invention uses a simple and robust control mechanism to compensate a nonlinear relationship between an input current and an input voltage, thereby minimizing the THD of the input current.

3. The PFC switching power conversion circuit of the present invention can reduce the THD of an input current by setting a minimum limit on the off time per switching cycle.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A PFC switching power conversion circuit providing low total harmonic distortion, including:
   a bridge rectifier for providing an input voltage by performing a rectifying operation on an AC voltage;
   an electromagnetic interference filtering circuit for providing a line voltage by performing a filtering operation on the input voltage;
   a switching power converter for converting the line voltage to an output voltage or an output current for a load under a control of a driving voltage, wherein the driving voltage causes a switching current to flow through a main inductor of the switching power converter in a waveform of triangular pulses; and
   a controller for receiving at least one feedback signal from the switching power converter to generate the driving voltage, the controller operating in a constant on-time mode to determine an on-time period of the driving voltage by processing the at least one feedback signal, and the on-time period determines a rising period for each of the triangular pulses of the switching current;
   wherein the controller includes an off-time detector and a timer, the off-time detector being used to detect decreasing periods of the switching current by processing the at least one feedback signal to determine off-time periods respectively, and the timer being used to set a minimum limit on the off-time periods.

2. The PFC switching power conversion circuit providing low total harmonic distortion as claim 1, wherein the controller further includes a driver for providing the driving voltage.

3. The PFC switching power conversion circuit providing low total harmonic distortion as claim 1, wherein the controller further includes a feedback circuit for processing the at least one feedback signal to generate an on-time determining signal for determining the on-time period, and generate an end-of-off-time signal for the off-time detector to determine the off-time periods.

4. The PFC switching power conversion circuit providing low total harmonic distortion as claim 3, wherein the controller further includes an on-time control unit for determining the on-time period according to the on-time determining signal.

5. The PFC switching power conversion circuit providing low total harmonic distortion as claim 1, wherein the AC voltage is a phase-cut AC voltage.

6. The PFC switching power conversion circuit providing low total harmonic distortion as claim 1, wherein the at least one feedback signal includes a voltage feedback signal and/or a current feedback signal.

7. The PFC switching power conversion circuit providing low total harmonic distortion as claim 1, wherein the switching power converter is an isolated switching power converter.

8. The PFC switching power conversion circuit providing low total harmonic distortion as claim 1, wherein the switching power converter is a non-isolated switching power converter.

9. The PFC switching power conversion circuit providing low total harmonic distortion as claim 1, wherein the controller includes a compensation circuit for adjusting the on-time period according to the at least one feedback signal.

10. The PFC switching power conversion circuit providing low total harmonic distortion as claim 1, wherein the timer has a fixed counting duration or an adjustable counting duration for determining the minimum limit.

* * * * *